Dec. 6, 1949     P. G. HANSEL     2,490,050
NAVIGATION SYSTEM
Filed Nov. 7, 1945     2 Sheets-Sheet 1
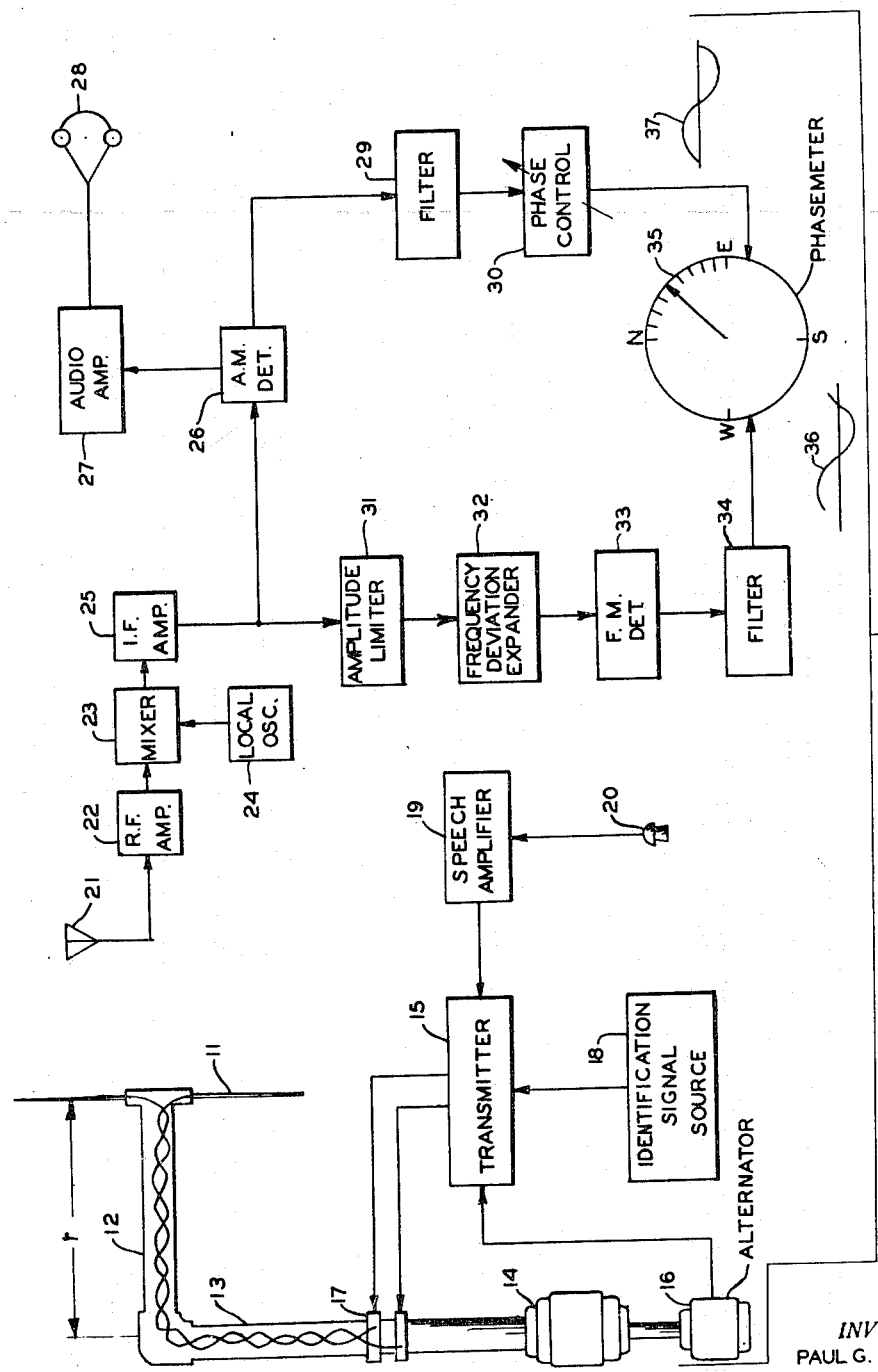
INVENTOR.
PAUL G. HANSEL
BY William D. Hall,
Attorney.

Dec. 6, 1949 P. G. HANSEL 2,490,050
NAVIGATION SYSTEM
Filed Nov. 7, 1945 2 Sheets-Sheet 2
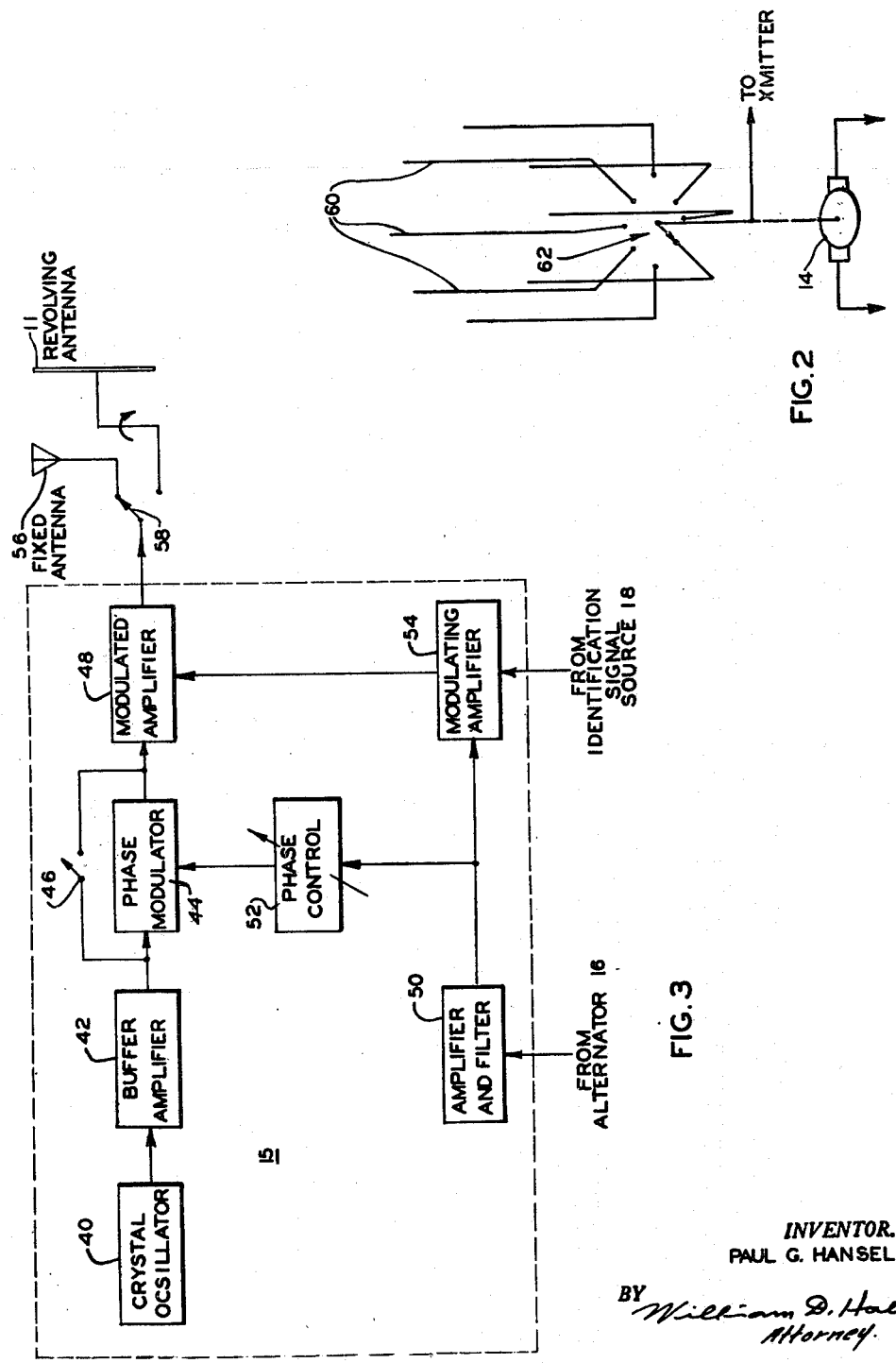
INVENTOR.
PAUL G. HANSEL
BY William D. Hall
Attorney.

Patented Dec. 6, 1949

2,490,050

UNITED STATES PATENT OFFICE 2,490,050

NAVIGATION SYSTEM

Paul G. Hansel, Red Bank, N. J.

Application November 7, 1945, Serial No. 627,272

23 Claims. (Cl. 343—102)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates broadly to direction finding and position finding methods and apparatus and, in particular, to omnidirectional radio navigation systems utilizing the well-known Doppler effect and a quasi-Doppler effect.

A prodigious number of beacon and navigational systems have been described in the patent literature which employ directive antennas to radiate a rotating directional radio beam. The most common practice is to produce a directional beam, generally with a figure-8 or cardinoid shape, then to rotate said beam continuously and, in addition, to transmit a reference signal which is modulated in amplitude or frequency at a rate which is harmonically or subharmonically related to the rotational angular velocity.

Although certain advantages may be claimed for the prior art systems, several very serious objections are common to them all. Among these are the practical difficulty of producing and accurately-controlling a directive beam, serious inaccuracies resulting from certain propagational irregularities to which, as is well-known, beam transmissions are particularly susceptible, the relatively wide frequency band required for transmission, the difficulty of transmitting directional information and communication intelligence simultaneously, and the lack of military security because of the ease with which the beacon signal can be recognized and employed by an enemy.

The present invention contemplates overcoming these difficulties by eliminating the necessity for directive beam radiation.

Throughout this disclosure and in the appended claims the term "directionally-characterized signal" will be employed whenever directional information is implicit in the periodic variation of one or more characteristics of a signal or derivable therefrom at a single point in space.

One of the objects of the present invention is to provide a novel system for the radiation of directionally-characterized signals which does not require a directional transmitting antenna.

Another object is to provide a receiver for deriving directional intelligence from directionally-characterized signals.

A further object is to provide radio navigation systems wherein the beacon transmitters are capable of transmitting voice communications or program material simultaneously with the transmission of directionally-characterized signals.

A still further object is to provide a simple and convenient method for transmitting calibrating signals from the beacon transmitters in a radio navigation system.

For a better understanding of the invention together with other and further objects thereof, reference is had to the following description taken in conjunction with the accompanying drawings, wherein:

Figure 1 is a block diagram of one form of radio navigation system in accordance with this invention, including a beacon transmitter and one form of receiving and indicating arrangement for deriving directional intelligence from the signals emitted by the transmitter;

Figure 2 shows a modified antenna for use with the transmitter of Fig. 1; and

Figure 3 shows a more detailed block diagram of the transmitter of Fig. 1, including, in addition, an arrangement for transmitting a calibrating signal.

Referring particularly to Fig. 1, a transmitter 15 supplies a carrier signal of the frequency $f_c$ to an omnidirectional antenna 11 through slip rings 17. The antenna 11 is supported by a horizontal arm 12 and a vertical shaft 13. A motor 14 drives the shaft with a uniform angular velocity $\omega_r$, thereby causing the antenna to revolve about the vertical shaft in a circular path of radius $r$.

The movement of the transmitting antenna 11 causes the phase of the signal received at each point in space to be advanced and retarded periodically. As a result, the signal radiated by antenna 11 is directionally characterized by periodic variations of phase. These phase variations are substantially a sinusoidal function of time and have the same amplitude in all directions. The envelope phase of these variations is, however, determined by the direction from the transmitting antenna to the point in space under consideration.

To derive directional intelligence from the transmitted signal at a given point in space, it is merely necessary to measure at said point the envelope phase of the above-described direction-dependent variations. For this purpose a locally-generated phase standard, such as a very stable oscillator, could be employed at the point of reception. However, since it is usually more convenient to transmit a reference signal, the transmitted carrier is amplitude-modulated by a signal of frequency $f_0$ which is derived from an alternator 16 driven by the motor 14. The frequency of the reference signal is harmonically related to the angular velocity at which the transmitting antenna revolves by the relation $f_0 = k\omega_r/2\pi$, where $k$ is a constant which may be integral or fractional.

The transmitted signal is therefore completely directionally characterized since, in accordance with the previously-stated definition, it is possible to receive this signal at a single point in space and to translate the periodic variations of amplitude and phase into directional intelligence. This fact will be apparent from an examination of the following mathematical expression for the signal field $E_x$ at any point X in space:

$$E_x = E_m \sin\left[\omega_c t - \frac{\omega_c S}{v} + \frac{\omega_c r}{v} \cos(\omega_r t - \alpha)\right](1 + A \sin k\omega_r t) \quad (1)$$

In this expression, the distance from the center of revolution of the transmitting antenna to point X is denoted by S, the velocity of propagation is denoted by $v$ and the direction from the transmitting antenna to point X, measured clockwise from north, is denoted by $\alpha$. The amplitude modulation index is A.

Equation 1 obviously represents a signal which is both amplitude and phase modulated. The amplitude modulation is substantially independent of direction whereas the envelope phase of the phase-modulation is a continuous function of direction.

The transmitter 15 may also be modulated by a suitably-coded identification signal derived from an identification signal source 18 and by voice communication signals or other intelligence. For this latter purpose a speech amplifier 19 and microphone 20 are provided.

Figure 1 also shows a superheterodyne receiver for receiving a signal of the general type represented by Equation 1 and for deriving directional intelligence therefrom. The receiver is entirely conventional up to and including the intermediate-frequency amplifier 25. The output of said intermediate-frequency amplifier is divided and impressed upon an amplitude limiter 31 and upon an amplitude-modulation detector 26.

The output of the amplitude-modulation detector 26 is connected to a monitoring channel, comprising an audio amplifier 27 and headphones 28, and to a reference-signal channel, comprising a filter 29, and a phase control 30. The output of phase control 30, which is a low-frequency reference signal 37 whose phase is substantially independent of direction, is impressed upon a direction indicator which in this case is a phase meter 35.

The frequency of the reference signal is $f_0$, previously defined by the relation, $f_0 = k\omega_r/2\pi$. The reference signal channel of the receiver is designed for the case wherein $k=1$ or $0=\omega_r/2\pi$. There may, under certain circumstances, exist practical factors which make it desirable to transmit the reference signal with a frequency which is a fractional multiple of $\omega_r/2\pi$. It is also possible to transmit a simple or a complex reference signal having no harmonic relation at all to $\omega_r/2\pi$. Under these circumstances, it will be necessary in the receiver design to interpose appropriate frequency multiplying or converting means between the detector 26 and the direction indicator.

The amplitude limiter 31 serves to reduce the amplitude modulation of the portion of the intermediate-frequency signal impressed thereon. The output of said limiter is therefore substantially a pure phase-modulated signal. This signal can be demodulated in a phase-modulation detector but, since such detectors are somewhat difficult to adjust, it is preferable to demodulate the signal in a frequency-modulation detector. To accomplish this the output of limiter 31 is impressed first upon a phase-deviation expander 32 which also expands the frequency deviation. Here the degree of frequency modulation is increased by performing the successive operations of frequency multiplying to a higher frequency, then heterodyning to a lower one, multiplying and heterodyning again, and so on until the final phase deviation, or its equivalent frequency deviation, is sufficient to permit efficient demodulation.

The output of the deviation expander 32 is then demodulated in a conventional frequency modulation detector 33. The output of said detector has the frequency $\omega_r/2\pi$ and a phase determined by the direction from the beacon transmitter to the receiving antenna 21. This output is impressed upon a filter 34 which serves to reduce the distortion produced in the detector. The filter output, a low-frequency direction-dependent signal 36, is impressed upon the phase meter 35 wherein its phase is compared with that of the reference signal to produce a directional indication.

The phase control 30 in the reference-signal channel is provided to compensate for the 90-degree envelope phase shift which occurs when a phase-modulated signal is demodulated as an equivalent frequency-modulated signal. This control can also be utilized to compensate for random phase shifts throughout the system as well as for arbitrary phase shifts of the reference signal which may be introduced from time-to-time for purposes of military security.

Thus far there has been described a beacon transmitter provided with a revolving antenna. In accordance with the familiar Doppler principle, the motion of the antenna produces direction-dependent phase and frequency variations in the radiated signal. A receiver has been described which is capable of translating such variations into directional intelligence.

In the practice of this invention it may, under certain circumstances, be inconvenient to revolve the transmitting antenna physically. This will be particularly true when the beacon transmitter is operated at the lower frequencies where the antenna dimensions are necessarily quite large. It will therefore be preferable under such circumstances to employ several fixed antennas and then to produce an effect substantially equivalent to the revolution of a single antenna. This can be accomplished, as shown in Fig. 2, by arranging a convenient number of antennas 60, for example eight to twelve, uniformly around the circumference of a circle and then connecting the output of the transmitter to these antennas in rapid succession by means of a suitable motor-driven commutating switch 62. The commutating arrangement may take several other forms. For example, each antenna can be terminated in a stationary coil, the several coils being arranged around a circle, and a rapidly-moving primary coil employed to transfer energy from the transmitter to the individual antennas in rapid succession. It is also possible to commutate the antennas electronically, without the use of mechanically-moving parts, by employing a tube or modulator between each antenna and the transmitter. The tubes or modulators can then be activated in rapid succession by applying appropriate switching or modulating potentials. A special beam-deflection commutating tube somewhat similar in construction to a cathode-ray tube could also be employed. This tube could be provided with properly-spaced target electrodes in place of the customary screen and a rotating deflection field could be used to scan or commutate the electrodes in very rapid succession.

When a multiple-antenna arrangement is employed, as described above, direction-dependent phase or frequency modulation of the radiated signal is produced by a quasi-Doppler effect resulting from the virtual motion of the radiating source.

It is possible, when the receiver is operated in rapidly-moving aircraft, that Doppler effect due to the motion of said craft will produce unintended changes in the effective carrier frequency of the beacon signal. Since in general, such frequency changes will be essentially constant rather than periodic in character, no interference with direction finding will result except possibly a slight apparent detuning of the receiver when a change occurs in the velocity of the aircraft relative to the beacon transmitter. Receiver detuning can be prevented by incorporating a conventional automatic frequency-control circuit with a relatively long time constant into the receiver.

It will be useful in some cases to design the filters 29 and 34 of Fig. 1 for relatively-high energy storage. This will result in an electrical "sluggishness" which will enhance the bearing stability and the general observational accuracy when transient variations in phase are produced by changing propagation conditions.

As previously stated, one of the objects of this invention is to provide a convenient method for transmitting calibrating signals from the beacon transmitters in a radio navigation system.

The transmission of a calibrating signal is particularly useful whenever the phase of the reference signal, relative to the phase of the antenna revolution, is changed from time-to-time to prevent unauthorized use of the beam transmissions. In those cases where a reference signal is produced locally within the receiver rather than transmitted, it is almost essential to accurate operation that calibrating information be transmitted.

A simple and convenient means for transmitting a calibrating signal is illustrated in Fig. 3 which is a detailed block diagram of the transmitter 15 shown in Fig. 1. In normal operation a carrier signal is derived from oscillator 40, amplified by the buffer amplifier 42 and then impressed upon the modulated amplifier 48. Switch 46 is normally closed to bypass the phase modulator 44. A reference signal from alternator 16 is passed through an amplifier and filter 50 and then impressed upon the modulating amplifier 54. The output of the latter amplifier is utilized to control the modulated amplifier 48. The modulated output of amplifier 48 is supplied to the revolving antenna 11 of Fig. 1 or to the commutated antenna 60 illustrated in Fig. 3.

Now, to transmit a calibrating signal, the output of the modulated amplifier 48 is switched put of the modulated amplifier 48 is switched from the revolving antenna 11 to a fixed antenna 56. This removes the direction-dependent phase modulation of the transmitted signal normally produced by the Doppler effect. Next, switch 46 is opened. The carrier excitation supplied to amplifier 48 is thereby passed through phase modulator 44 wherein it is phase modulated by a portion of the reference signal which has been passed through a phase control 52. The phase modulation produced in this manner has an arbitrarily-fixed envelope phase relative to the reference signal which can be varied at will by adjusting the phase control 52. The angular frequency of said modulation is $\omega_r$. While such a calibrating signal is being transmitted, the phase control 30 in the remote receiver of Fig. 1 can be adjusted to produce a zero-degree reading on the direction indicator 35 or any other arbitrary calibration reading which may have been agreed upon. In the cases where the reference signal is generated locally, a similar phase control can be employed to facilitate calibration.

The beacon transmitters will, in general, be operated in groups of three or four so that a ship or aircraft equipped with a receiver can obtain a "fix" by triangulation. It may sometimes be convenient to operate these transmitters in fairly rapid sequence on the same frequency. Moreover, since the directional intelligence is implicit in the phase of a sinusoidal low-frequency signal obtained from the receiver, the design of automatic plotting or automatic position-computing apparatus for use with the navigation system described herein is greatly facilitated.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. The method of transmitting a directionally-characterized signal which comprises the steps of generating a carrier wave, modulating said carrier wave with a reference signal of lower frequency, omnidirectionally radiating the resulting modulated carrier wave from a position on a curved path and effectively imparting a continuous and periodic motion to said position along said curved path.

2. The method as set forth in claim 1, wherein the angular frequency of said reference-signal is harmonically or subharmonically related to the effective angular velocity of said position.

3. The method of transmitting a directionally-characterized signal which comprises the steps of generating a carrier wave, modulating said carrier wave with a reference signal of lower frequency, omnidirectionally radiating the resulting modulated wave from a position on the circumference of a circle, and revolving said position about the center of said circle at a substantially uniform angular velocity.

4. The method as set forth is claim 3, wherein the angular frequency of said reference signal is harmonically or subharmonically related to said angular velocity.

5. The method of transmitting a directionally-characterized signal which comprises the steps of generating a carrier wave, amplitude-modulating said carrier wave continuously with a reference signal of lower frequency, omnidirectionally radiating the resulting modulated wave from a position on the circumference of a circle, and revolving said position about the center of said circle at a substantially uniform angular velocity.

6. The method of direction finding which comprises the steps of generating a carrier wave, modulating said carrier wave with a reference signal of lower frequency, radiating the resulting modulated carrier wave from a position on the circumference of a circle, effectively revolving said position about the center of said circle at a substantially uniform angular velocity to produce periodic phase modulation of the radiated wave, receiving said radiated wave at a remote point, and measuring the relative phase of said reference signal and said phase modulation.

7. A system for radiating directionally-characterized signals comprising a source of wave energy, a plurality of radiating elements uniformly spaced on the circumference of a circle, and means for successively transferring energy from said source to said radiating elements to produce direction-dependent phase variations of the radiated wave energy, said phase variations having a substantially uniform amplitude in all the directions contained in at least one plane.

8. In combination with a system as set forth in claim 7, receiving and indicating means for deriving directional intelligence from said radiated wave energy.

9. In a system for transmitting directionally-characterized signals, a source of wave energy, means for modulating said wave energy with a low-frequency reference signal, horizontally-omnidirectional radiating means for said wave energy, and means for revolving said radiating means about a point at a substantially uniform angular velocity.

10. In combination with a system as set forth in claim 9, remote receiving and indicating means for deriving directional intelligence from said directionally-characterized signals.

11. In a system as set forth in claim 9, calibration means comprising means for imposing phase modulation upon said wave energy, the envelope phase of said phase modulation being independent of direction and the angular frequency of said phase modulation being equal to said angular velocity.

12. In a system for transmitting directionally-characterized signals, a source of wave energy, means for modulating said wave energy with a low-frequency reference signal, a plurality of essentially-omidirectional radiating elements uniformly spaced on the circumference of a circle, and means for transferring modulated wave energy to said radiating elements in rapid succession to produce periodic direction-dependent phase variations of the radiated wave energy, said phase variations having a substantially uniform amplitude in all the directions contained in at least one plane.

13. In combination with a system as set forth in claim 12, a remote receiver including direction-indicating means responsive to the phase relation between said reference signal and said phase variations.

14. In a direction finding system, a source of wave energy, radiating means for said wave energy, means for effectively revolving said radiating means about a center point at a substantially uniform angular velocity to impose phase modulation upon the radiated wave energy, and remote receiving means including means for translating the envelope phase of said phase modulation into directional intelligence.

15. The system according to claim 14, wherein said radiating means is omnidirectional in a horizontal plane.

16. In a direction finding system wherein there is transmitted a beacon signal which is characterized by low-frequency modulation which imposes upon said signal a direction-dependent envelope phase, the method of calibrating said system which comprises the steps of suppressing said modulation, and imposing upon said signal another modulation of the same type and frequency to produce a signal having an envelope phase which is independent of direction.

17. In a direction finding system wherein there is transmitted a beacon signal which is characterized by a low-frequency modulation which imposes upon said signal a direction-dependent envelope phase, and wherein said signal is received on a receiver which includes means responsive to said envelope phase, the method of calibrating said means which comprises the steps of suppressing the modulation of said transmitted signal, imposing upon said transmitted signal another modulation of the same type and frequency to produce a signal having an envelope phase which is independent of direction, and utilizing said last-named modulation to calibrate said envelope-phase-responsive means.

18. The method as set forth in claim 1, wherein the angular frequency of said reference signal is equal to the effective angular velocity of said position.

19. The method as set forth in claim 3, wherein the angular frequency of said reference signal is equal to said angular velocity.

20. In a system as set forth in claim 9, wherein the angular frequency of said reference signal is equal to said angular velocity.

21. The method of establishing a directionally-characterized beacon signal in a given plane, comprising: generating a wave of constant phase and frequency, transmitting said wave, continuously revolving the point of transmission of said wave along a circle at a uniform angular velocity having a component of linear velocity variation along every direction in said given plane to impart to a signal received along every direction in said plane a detectable amount of phase modulation having a direction-dependent phase.

22. The method of determining the position of a first arbitrarily positioned location relative to a second location, comprising: establishing a directionally-characterized beacon signal at said second location by generating a carrier wave of constant frequency and phase, transmitting said wave from a position on the circumference of a circle and continuously revolving said position about the center of said circle at a uniform angular velocity having a component of velocity variation relative to said first point which is large enough to impose a detectable amount of phase modulation having a direction-dependent phase on the beacon signal reaching said first point; receiving said beacon signal at said first point and indicating the phase of the phase modulation of the received signal to provide an indication of said position.

23. In the method of direction finding, the steps of generating a carrier wave, radiating said carrier wave omnidirectionally in at least one plane and imposing phase modulation upon said radiated carrier wave, said phase modulation being characterized by substantially uniform amplitude in all directions in said plane and by a direction-dependent envelope phase, and modulating said carrier wave by a reference signal having a phase which is substantially independent of direction.

PAUL G. HANSEL.

(References on following page)

REFERENCES CITED

The following references are of record in the file of this patent:

UNITED STATES PATENTS

| Number | Name | Date |
|---|---|---|
| 833,034 | De Forest | Oct. 9, 1906 |
| 2,133,615 | Gerhard | Oct. 18, 1938 |
| 2,212,110 | Beuermann | Aug. 20, 1940 |
| 2,225,456 | Koschmieder | Dec. 17, 1940 |
| 2,257,320 | Williams | Sept. 30, 1941 |
| 2,275,254 | Falloon | Mar. 3, 1942 |
| 2,313,048 | Byrne | Mar. 9, 1943 |
| 2,377,902 | Relson | June 12, 1945 |
| 2,403,727 | Loughren | July 9, 1946 |
| 2,404,196 | Seeley | July 16, 1946 |
| 2,405,203 | Goldstein | Aug. 6, 1946 |
| 2,409,560 | Haight | Oct. 15, 1946 |
| 2,411,518 | Busignies | Nov. 26, 1946 |
| 2,414,798 | Budenbom | Jan. 28, 1947 |
| 2,432,926 | Norton | Dec. 16, 1947 |

OTHER REFERENCES

Communication Engineering, by W. L. Everitt; second edition 1937; McGraw-Hill Book Co., New York, N. Y.; p.52 (copy—Div. 51).

Radio Engineer's Handbook, by F. E. Terman; 1st ed. 1943; McGraw-Hill Book Co., New York, N. Y.; p. 198 (copy in Div 51).

Radio Engineering, by F. E. Terman; 3rd ed. 1947; McGraw-Hill Book Co., New York, N. Y. pp. 660, 661, 726, 727, 728, 729 (copy in Div. 51).

Certificate of Correction

Patent No. 2,490,050                                                  December 6, 1949

PAUL G. HANSEL

It is hereby certified that error appears in the printed specification of the above numbered patent requiring correction as follows:

Column 3, line 56, for "$_o = \omega_r/2\pi$" read $f_o = \omega_r/2\pi$;

and that the said Letters Patent should be read with this correction therein that the same may conform to the record of the case in the Patent Office.

Signed and sealed this 18th day of April, A. D. 1950.

[SEAL]

THOMAS F. MURPHY,
*Assistant Commissioner of Patents.*